United States Patent
Shimizu et al.

(10) Patent No.: US 10,614,961 B2
(45) Date of Patent: Apr. 7, 2020

(54) METHOD FOR PRODUCING ELECTRODE FOR ALUMINUM ELECTROLYTIC CAPACITOR

(71) Applicant: NIPPON LIGHT METAL COMPANY, LTD., Tokyo (JP)

(72) Inventors: Yuta Shimizu, Shizuoka (JP); Yuya Yoshida, Shizuoka (JP); Masahiko Katano, Shizuoka (JP); Shinya Sone, Osaka (JP); Masashi Mehata, Osaka (JP); Toshifumi Taira, Osaka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/780,447

(22) PCT Filed: Sep. 20, 2016

(86) PCT No.: PCT/JP2016/077697
§ 371 (c)(1),
(2) Date: May 31, 2018

(87) PCT Pub. No.: WO2017/098771
PCT Pub. Date: Jun. 15, 2017

(65) Prior Publication Data
US 2018/0350526 A1 Dec. 6, 2018

(30) Foreign Application Priority Data
Dec. 10, 2015 (JP) .................................. 2015-240688

(51) Int. Cl.
*H01G 9/00* (2006.01)
*H01G 9/045* (2006.01)
(Continued)

(52) U.S. Cl.
CPC ........... *H01G 9/045* (2013.01); *H01G 9/0029* (2013.01); *H01G 9/055* (2013.01); *C23F 1/20* (2013.01);
(Continued)

(58) Field of Classification Search
CPC ....... H01G 9/045; H01G 9/0029; H01G 9/055
See application file for complete search history.

(56) References Cited

U.S. PATENT DOCUMENTS

| 4,969,974 A | 11/1990 | Kunugihara |
| 5,449,448 A | 9/1995 | Kurihara et al. |
| 2015/0221443 A1 | 8/2015 | Katano et al. |

FOREIGN PATENT DOCUMENTS

| CN | 101930851 A | 12/2010 |
| CN | 104620342 A | 5/2015 |

(Continued)

OTHER PUBLICATIONS

WIPO, International Search Report for PCT/JP2016/077697, dated Dec. 6, 2016.

(Continued)

*Primary Examiner* — Seahvosh Nikmanesh (57) ABSTRACT

An aluminum electrode in which a porous layer made of a sintered layer of aluminum powder having an average particle diameter of 1 μm to 10 μm is laminated in a thickness of 150 μm to 3000 μm on a surface of an aluminum core material is produced by chemical formation to produce an anode for an electrolytic capacitor. In this process, an organic acid immersion step of immersing the aluminum electrode in an organic acid aqueous solution containing dodecanoic acid, benzoic acid, propanedioic acid, butanedioic acid, (E)-2-butenedioic acid, 2-hydroxypropane-1,2,3-tricarboxylic acid, (E)-1-propene-1,2,3-tricarboxylic acid, or the like is carried out after a pure water boiling step and before a chemical formation step. In the chemical formation (Continued)

step, a phosphoric acid immersion step of immersing the aluminum electrode in an aqueous solution containing phosphate ions is carried out one or more times in the course of raising a film withstand voltage to a chemical formation voltage.

3 Claims, 6 Drawing Sheets

(51) Int. Cl.
*H01G 9/052* (2006.01)
*H01G 9/055* (2006.01)
*C23F 1/20* (2006.01)
*H01G 9/04* (2006.01)

(52) U.S. Cl.
CPC ......... *H01G 9/0032* (2013.01); *H01G 9/0525* (2013.01); *H01G 2009/0408* (2013.01); *H01G 2009/0416* (2013.01)

(56) References Cited

FOREIGN PATENT DOCUMENTS

| | | |
|---|---|---|
| EP | 2897143 A1 | 7/2015 |
| JP | S59-89796 A | 5/1984 |
| JP | S60-35513 A | 2/1985 |
| JP | H06-275473 A | 9/1994 |
| JP | 2004-253755 A | 9/2004 |
| JP | 5490446 A | 1/2011 |
| JP | 2011-52291 A | 3/2011 |
| JP | 2014-57000 A | 3/2014 |

OTHER PUBLICATIONS

WIPO, Written Opinion of the International Searching Authority for PCT/JP2016/077697, dated Dec. 6, 2016.
European Patent Office, The extended European search report for EP Application No. 16872671.9, dated Jul. 3, 2019.
CN Patent Office, Search Report for Chinese Patent Application No. 201680071191.8, dated Jun. 26, 2019.
Japan Patent Office, Office Action for Japanese Patent Application No. 2015-240688, dated Jul. 9, 2019.

Method(1), Method(2)

Method(3)

Method(4)

FIG.4

METHOD FOR PRODUCING ELECTRODE FOR ALUMINUM ELECTROLYTIC CAPACITOR

FIELD

The present invention relates to a method for producing an electrode for an aluminum electrolytic capacitor that performs chemical formation of an aluminum electrode.

BACKGROUND

Use of an aluminum electrode (a porous aluminum electrode) in which a porous layer made of a sintered layer of aluminum powder is laminated on a surface of an aluminum core material instead of aluminum foil subjected to etching treatment as an anode of an aluminum electrolytic capacitor has been developed. According to such an aluminum electrode, there is an advantage that an etching process using hydrochloric acid or the like is not necessary to be carried out (refer to Patent Literature 1). In addition, when the porous aluminum electrode is used, there are advantages that a sufficiently thick porous layer can be formed and the electrostatic capacitance can be increased due to a structure in which pores are complicatedly intricate.

Figure 5:
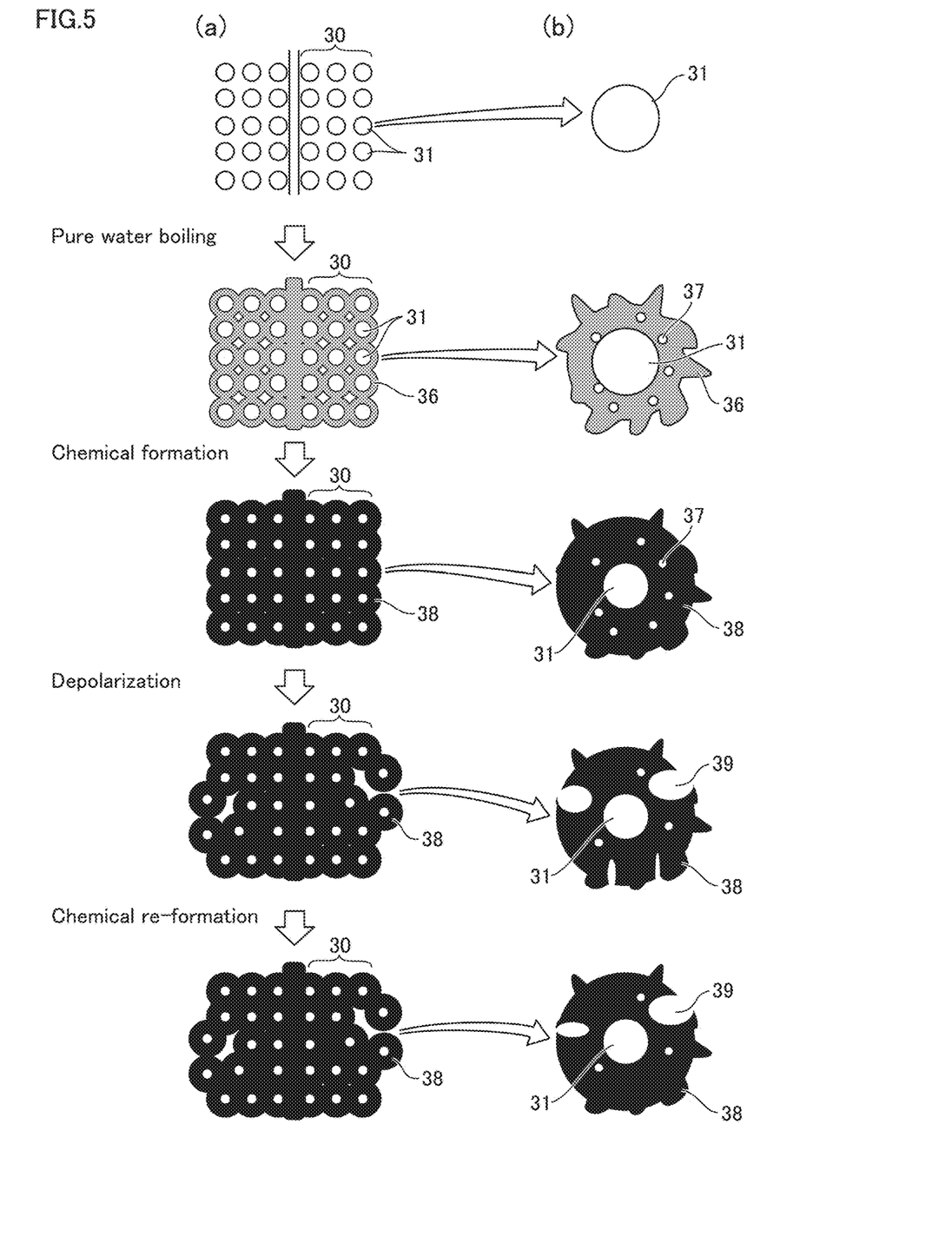
FIG. 5 is an explanatory view schematically illustrating a reason why the leakage current tends to become large in the case of a porous aluminum electrode.

However, when the porous aluminum electrode is used as anode foil for medium and high voltage, leakage current tends to be larger than that of the aluminum foil subjected to the etching treatment. The reason is considered to be, for example, the reasons described below with reference to FIG. 5. FIG. 5 is a view schematically illustrating the reason why the leakage current tends to become large when the porous aluminum electrode is used. FIG. 5(a) schematically illustrates the state of the porous layer 30 in the production process of the anode for an electrolytic capacitor and FIG. 5(b) schematically illustrates the state of aluminum powder 31 constituting the porous layer 30 in the production process of the anode for an electrolytic capacitor.

When the porous aluminum electrode is subjected to pure water boiling, a hydrated film 36 is formed on the surfaces of the porous layer 30 and the aluminum powder 31 illustrated in FIGS. 5(a) and 5(b). Such a hydrated film 36 is porous and voids 37 exist. In particular, in the case of a porous aluminum electrode, the voids 37 tend to be generated in the hydrated film 36 because the surface of the aluminum powder 31 constituting the porous layer 30 has higher reactivity with boiling pure water than that of the surface of the etching layer. Such voids 37 can be removed from the chemical formation film 38 by depolarization such as thermal depolarization treatment or the like when the chemical formation voltage is relatively low (for example, when the chemical formation voltage is less than 400 V) in a chemical formation step. However, when the chemical formation voltage is relatively high (for example, when the chemical formation voltage is 400 V or more), the voids cannot be sufficiently removed because the chemical formation film 38 is thick. Therefore, the chemical formation liquid left behind in the void 37 cannot be removed by pure water washing or the like. Consequently, when the chemical formation liquid expands during the subsequent chemical formation treatment or thermal depolarization treatment, defects 39 are generated in the chemical formation film 38 and thus the leakage current increases. Such a phenomenon is remarkable particularly when the chemical formation is carried out in an aqueous solution containing an organic acid or a salt thereof. More specifically, the organic acid in the chemical formation liquid remaining inside the void 37 burns/explodes due to the heat generated during the chemical formation or the heat of the thermal depolarization treatment. This breaks the chemical formation film 38 and the porous layer 30. As a result, the leakage current increases.

On the other hand, in order to reduce the leakage current, a method for producing aluminum foil for an electrolytic capacitor including a step of depositing an organic acid on the surface of a hydrated film after pure water boiling has been developed (Patent Literature 2).

CITATION LIST

Patent Literature

Patent Literature 1: Japanese Patent Application Publication No. 2011-52291
Patent Literature 2: Japanese Patent No. 5490446

SUMMARY

Technical Problem

However, when the technology described in Patent Literature 2 is applied to the production of the anode foil for medium and high voltage from the porous aluminum electrode, the organic acid used for organic acid immersion treatment remains inside the pores of the porous layer 30 and inside the voids 37 because the porous layer has the structure in which the pores are complicatedly deeply intricate as compared with the structure of the etching layer. This causes the problem that the organic acid burns/explodes due to the heat generated during the chemical formation or the heat of the thermal depolarization treatment to break the chemical formation film and the porous layer, resulting in an increase in leakage current.

In consideration of the above problems, an object of the present invention is to provide a method for producing an anode for an electrolytic capacitor that can reduce leakage current by preventing break of the film or the porous layer when the porous aluminum electrode is subjected to the chemical formation.

Solution to Problem

In order to solve the above problems, a method for producing an anode for an electrolytic capacitor according to the present invention comprises:

a pure water boiling step of boiling an aluminum electrode in which a porous layer made of a sintered layer of aluminum powder having an average particle diameter of 1 μm to 10 μm is laminated in a thickness of 150 μm to 3000 μm on a surface of an aluminum core material in pure water;

an organic acid immersion step of immersing the aluminum electrode in an organic acid aqueous solution containing an organic acid represented by any one of Chemical Formulas (1), (2), and (3) after the pure water boiling step, R—COOH      Chemical Formula (1)

R—(COOH)$_2$      Chemical Formula (2)

R—(COOH)$_3$      Chemical Formula (3)

in Chemical Formulas (1), (2), and (3)
R is a saturated hydrocarbon, an unsaturated hydrocarbon, or an aromatic hydrocarbon having 1 or more carbon atoms; and a chemical formation step of performing chemical formation of the aluminum electrode to a chemical formation voltage of 400 V or more after the organic acid immersion step, in which in the chemical formation step, a phosphoric acid immersion step of immersing the aluminum electrode in an aqueous solution containing phosphate ions is carried out one or more times in the course of raising voltage to the chemical formation voltage.

The aluminum electrode used in the present invention is a porous aluminum electrode in which a porous layer made of a sintered layer of aluminum powder having an average particle diameter of 1 μm to 10 μm is laminated in a thickness of 150 μm to 3000 μm on a surface of an aluminum core material. Therefore, even when the aluminum electrode is subjected to the chemical formation until film withstand voltage reaches 400 V or more, high electrostatic capacitance can be obtained. Here, when the average particle diameter is less than 1 μm, pore parts are excessively fine and thus a desired electrostatic capacitance cannot be obtained because the pores are buried when the film is formed at a film withstand voltage of 400 V or more. In contrast, when the average particle diameter is more than 10 μm, the pore parts are excessively coarse and thus a desired electrostatic capacitance cannot be obtained, because the surface area is reduced. On the other hand, the surface of the porous layer has higher reactivity with boiling pure water than that of the surface of the etched aluminum foil and thus voids are likely to be formed in the hydrated film produced in the pure water boiling step. Such voids can be removed by depolarization treatment when the chemical formation voltage is less than 400 V. However, when the chemical formation is carried out at a voltage of 400 V or more, the thickness of the film formed by the chemical formation becomes thick and thus the void cannot be sufficiently removed. Therefore, the chemical formation liquid left behind in the voids cannot be removed by pure water washing or the like and expands/explodes during the subsequent chemical formation treatment or thermal depolarization treatment, so that a defect is generated in the film and the leakage current increases. In the present invention, however, the organic acid immersion step is carried out after the pure water boiling step, and thus dissolution of the hydrated film into the chemical formation liquid can be reduced and the voids generated in the pure water boiling step can be exposed by the dissolution of the hydrated film in the organic acid immersion step. Therefore, the voids in the chemical formation film can be reduced. In addition, the phosphoric acid immersion step is carried out in the course of the voltage rise and thus the organic acid remaining inside the porous layer after the organic acid immersion step can be removed. When the pore part of the porous layer is thick and complicated, clogging tends to occur due to precipitation of aluminum hydroxide even when chemical formation liquid conditions and depolarization conditions are optimized. In the present invention, however, the precipitated aluminum hydroxide can be effectively removed before clogging occurs due to the phosphoric acid immersion step carried out in the course of the voltage rise and formation of aluminum hydroxide thereafter can be reduced. Therefore, the residual chemical formation liquid in the pores of the porous layer can be reduced. In addition, phosphate ions can be taken into the chemical formation film by the phosphoric acid immersion step and thus the stability of the chemical formation film such as being possible to improve durability to immersion in boiling water or acidic solution can be effectively improved.

In the present invention, the organic acid may be, for example, any one of dodecanoic acid, benzoic acid, propanedioic acid, butanedioic acid, (E)-2-butenedioic acid (fumaric acid), pentanedioic acid, hexanedioic acid, decanedioic acid, dodecanedioic acid, 2-hydroxypropane-1,2,3-tricarboxylic acid, and (E)-1-propene-1,2,3-tricarboxylic acid.

The present invention is particularly effective when the present invention is applied in the case where the chemical formation step includes an organic acid chemical formation step of carrying out the chemical formation in an aqueous solution containing an organic acid or a salt thereof in the course of raising the film withstand voltage to the chemical formation voltage, in which the phosphoric acid immersion step is carried out in the course of the organic acid chemical formation step. When the organic acid remains inside the voids or inside the porous layer at the time of carrying out the chemical formation in an aqueous solution containing the organic acid or the salt thereof, the heat generated during the chemical formation or the heat of the thermal depolarization treatment causes the organic acid to burn/explode. This may break the chemical formation film and the porous layer to increase the leakage current. According to the present invention, however, the residual chemical formation liquid inside of the voids or inside the pores of the porous layer can be reduced by the phosphoric acid immersion step. Therefore, the increase in the leakage current caused by the burning/explosion of the organic acid can be prevented.

Advantageous Effects of Invention

In the present invention, the porous aluminum electrode in which the porous layer made of the sintered layer of the aluminum powder having an average particle diameter of 1 μm to 10 μm is laminated in a thickness of 150 μm to 3000 μm on the surface of the aluminum core material is used as the aluminum electrode and thus high electrostatic capacitance can be obtained. In addition, the organic acid immersion step is carried out after the pure water boiling step and thus the voids generated during the pure water boiling step can be exposed and thus the voids in the chemical formation film can be reduced. In addition, the phosphoric acid immersion step is carried out in the course of the voltage rise and thus the organic acid remaining inside the porous layer can be removed and the clogging due to the precipitation of aluminum hydroxide can be reduced. Therefore, the residual chemical formation liquid inside the pores of the porous layer can be reduced. In addition, phosphate ions can be taken into the chemical formation film by the phosphoric acid immersion step and thus the stability of the chemical formation film such as being possible to improve durability to immersion in boiling water or acidic solution can be effectively improved.

DESCRIPTION OF EMBODIMENTS

In the present invention, in producing the electrode for an aluminum electrolytic capacitor, an aluminum electrode (a porous aluminum electrode) in which a porous layer made by sintering aluminum powder is laminated on the surface of the aluminum core material is used and such an aluminum electrode is subjected to the chemical formation. Hereinafter, after the structure of the aluminum electrode will be described, the chemical formation method will be described.

(Constitution of Aluminum Electrode)

Figure 1A:
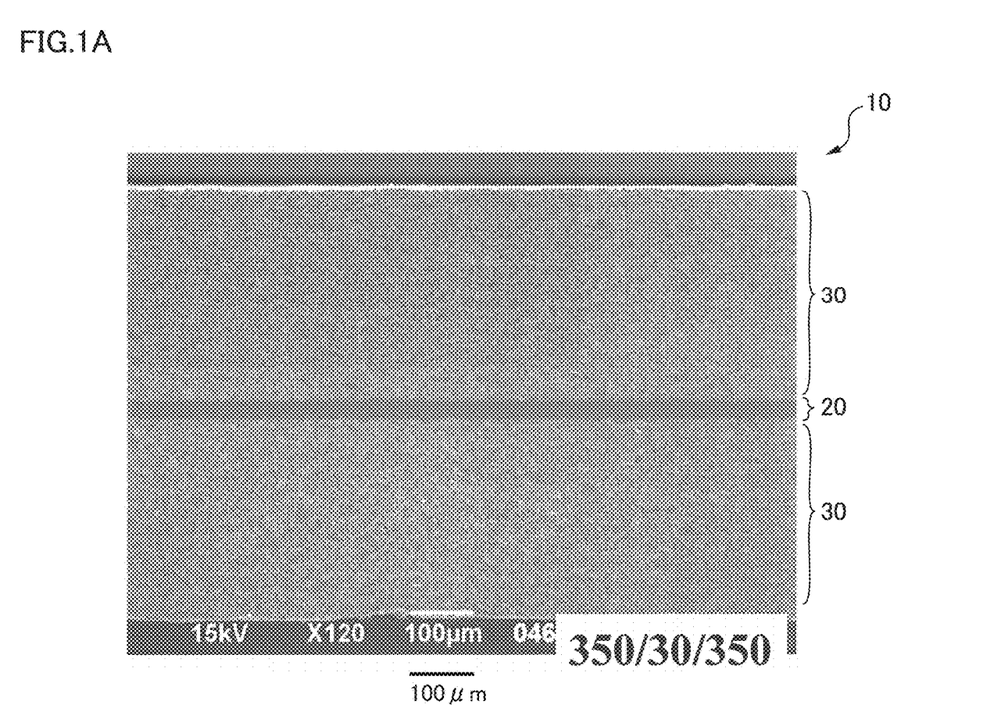
FIG. 1 is an explanatory view illustrating a sectional structure of an aluminum electrode to which the present invention is applied.
Figure 1B:
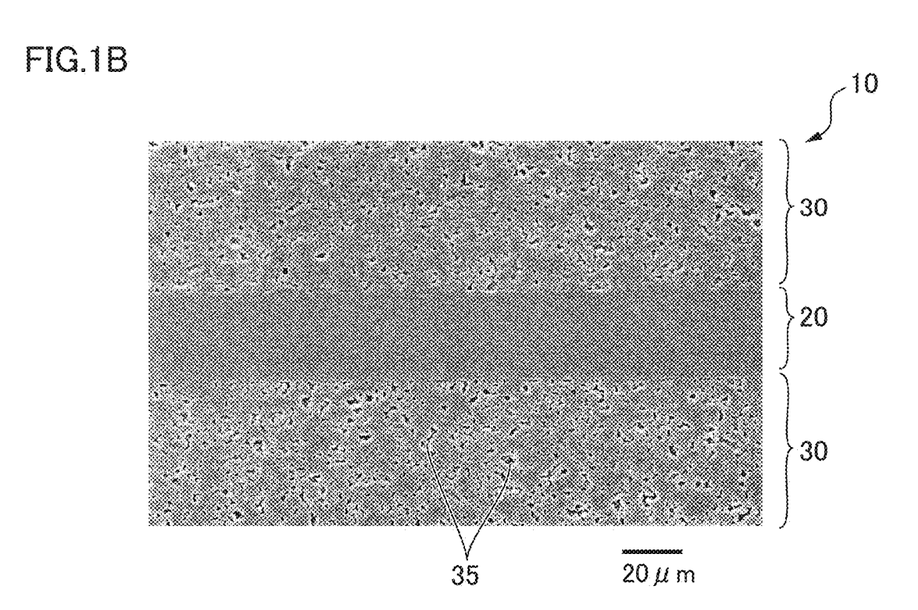
Figure 2:
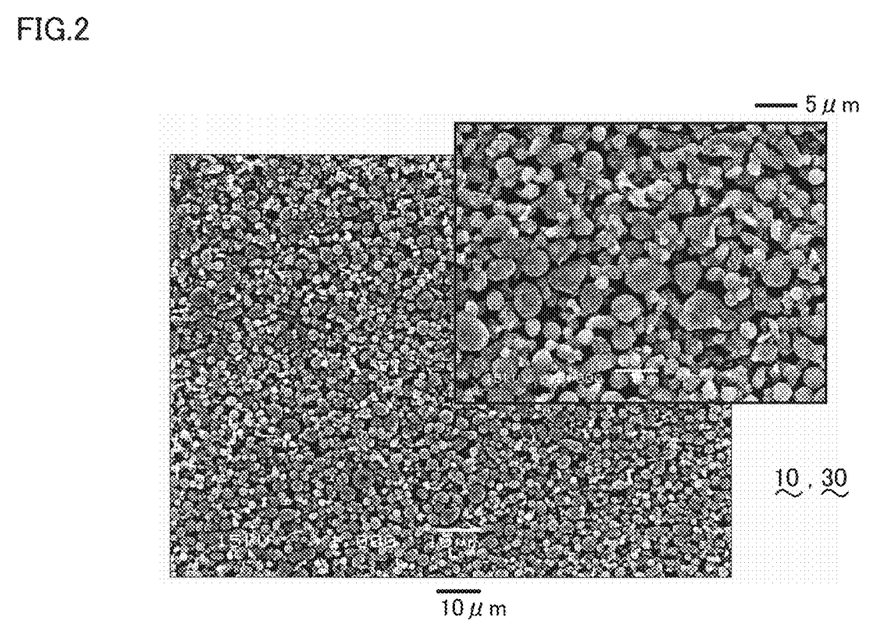
FIG. 2 is a photograph taken by magnifying the surface of the aluminum electrode to which the present invention is applied with an electron microscope.

FIG. 1 is an explanatory view illustrating a sectional structure of an aluminum electrode to which the present invention is applied. FIGS. 1(a) and 1(b) are a photograph taken by magnifying the cross section of the aluminum electrode at 120 times with an electron microscope and a photograph taken by magnifying the vicinity of the core material of the aluminum electrode at 600 times with the electron microscope, respectively. FIG. 2 is a photograph taken by magnifying the surface of the aluminum electrode to which the present invention is applied with the electron microscope. Here, FIG. 2 illustrates both photograph magnifying the surface of the porous aluminum electrode at 1000 times and photograph magnifying the surface at 3000 times.

The aluminum electrode 10 illustrated in FIG. 1 and FIG. 2 has the aluminum core material 20 and the porous layer 30 laminated on the surface of the aluminum core material 20 and the porous layer 30 is a layer made by sintering the aluminum powder. In this embodiment, the aluminum electrode 10 has the porous layers 30 on both surfaces of the aluminum core material 20.

In this embodiment, the aluminum core material 20 has a thickness of 10 μm to 50 μm. In FIG. 1, the aluminum electrode 10 using the aluminum core material 20 having a thickness of about 30 μm is illustrated. The thickness of the porous layer 30 per layer is, for example, 150 μm to 3000 μm. FIG. 1 illustrates the aluminum electrode 10 in which the porous layer 30 having a thickness of about 350 μm is formed on both surfaces of the aluminum core material 20 having a thickness of 30 μm. As the thickness of the porous layer 30 becomes thicker, the electrostatic capacitance increases. Consequently, a thicker thickness is preferable. A thickness more than 3000 μm, however, tends to have difficulty in carrying out the chemical formation to the deep part of the pores 35 of the porous layer 30 and thus the thickness of the porous layer 30 is preferably 3000 μm or less.

The aluminum core material 20 preferably has an iron content of less than 1000 ppm by mass. The porous layer 30 is a layer made by sintering the aluminum powder having an iron content of preferably less than 1000 ppm by mass and the aluminum powder is sintered while the pores 35 is being retained with each other.

The shape of the aluminum powder is not particularly limited and any of a substantially spherical shape, an indeterminate shape, a scaly shape, a short fiber shape, and the like can be suitably used. In particular, in order to maintain the pores between the aluminum powders, the powder composed of substantially spherical particles is preferable.

The average particle diameter of the aluminum powder in this embodiment is from 1 μm to 10 μm. Therefore, the surface area can be effectively expanded. Here, when the average particle diameter of the aluminum powder is less than 1 μm, the gap between the aluminum powders is excessively narrow and thus ineffective parts that do not function as the electrode or the like increase, whereas when the average particle diameter of the aluminum powder is more than 10 μm, the gap between the aluminum powder is excessively wide and thus enlargement the surface area is insufficient. In other words, when the average particle diameter of the aluminum powder is less than 1 μm, the pores 35 between the aluminum powders are buried to reduce the electrostatic capacitance when the chemical formation film having a film withstand voltage of 400 V or more is formed. On the other hand, when the average particle diameter is more than 10 μm, the pores 35 become excessively large and thus significant improvement in the electrostatic capacitance is not expected. Therefore, when the thick chemical formation film having a film withstand voltage of 400 V or more is formed on the aluminum electrode 10, the average particle diameter of the aluminum powder used for the porous layer 30 is 1 μm to 10 μm and preferably 2 μm to 10 μm. As the average particle diameter of the aluminum powder in this embodiment, particle size distribution in terms of volume basis is measured by a laser diffraction method. The average particle diameter of the powder after sintering is measured by observing the cross section of the sintered body with a scanning electron microscope. For example, although the powder after sintering is in a state where a part of the powder after sintering is melted or the powders are connected to each other, a part having a substantially circular shape can be regarded as approximately particle shape. A volume based particle size distribution is calculated from the number based particle size distribution to determine the average particle diameter. Here, the average particle diameter before the sintering and the average particle diameter after the sintering determined above are substantially the same.

In this embodiment, when the aluminum electrode 10 is used as the anode of an aluminum electrolytic capacitor, a chemical formation film is formed on the porous layer 30. At that time, when the part of the aluminum core material 20 exposed from the porous layer 30 exists, a chemical formation film is also formed on the aluminum core material 20.

(Method for Manufacturing Aluminum Electrode 10)

In the method for producing the porous aluminum electrode 10 to which the present invention is applied, first, in the first step, a film made of a composition including the aluminum powder having an iron content of preferably less than 1000 ppm by mass is formed on the surface of the aluminum core material 20. The aluminum powder is produced by an atomization method, a melt spinning method, a rotating disc method, a rotating electrode method, and other rapid cooling solidification methods. Among these methods, the atomization method, particularly a gas atomization method is preferable for industrial production. In the atomization method, a powder is obtained by atomizing the molten metal.

The composition may include a resin binder, a solvent, a sintering aid, a surfactant, and the like, if necessary. Known or commercially available additives may be used as these additives. In this embodiment, the composition is preferably used as a paste-like composition including at least one resin binder and solvent. This formulation allows the film to be efficiently formed. Suitably usable examples of the resin binder include a carboxy-modified polyolefin resin, a vinyl acetate resin, a vinyl chloride resin, a vinyl chloride-vinyl acetate copolymer resin, a vinyl alcohol resin, a butyral resin, a fluorinated vinyl resin, an acrylic resin, a polyester resin, a urethane resin, an epoxy resin, a urea resin, a phenol resin, an acrylonitrile resin, and a nitrocellulose resin. Depending on the molecular weight, the type of resin, and the like, these binders are separated into binders volatilized at the time of heating and binders residues of which remain together with the aluminum powder by thermal decomposition. Consequently, these binders can be used properly depending on the requirement of electric characteristics such as electrostatic capacitance. When the composition is prepared, a solvent is added. As such a solvent, water, ethanol, toluene, ketones, esters, and the like can be used singly or in combination.

The formation of the porous layer 30 can be appropriately selected from known methods depending on the properties of the composition and the like. For example, when the composition is powder (solid), the compacted powder of the powder may be formed (or thermocompression bonded) on the core material. In this case, the compacted powder can be solidified by sintering and the aluminum powder can be fixed onto the aluminum core material 20. When the composition is a liquid state (a paste state), the porous layer 30 can be formed by a coating method such as roller, brush, spray, dipping, and the like or can be formed by a known printing method. The film may be dried at a temperature within a range of 20° C. to 300° C., if necessary.

Subsequently, in the second step, the film is sintered at a temperature of 560° C. or more and 660° C. or less. The sintering time varies depending on the sintering temperature and the like. Usually, the sintering time can be appropriately determined within a range of about 5 hours to about 24 hours. The sintering atmosphere is not particularly limited and, for example, may be any of a vacuum atmosphere, an inert gas atmosphere, an oxidizing gas atmosphere (atmospheric air), a reducing atmosphere, and the like. In particular, the vacuum atmosphere or the reducing atmosphere is preferable. In addition, the pressure condition may be any of normal pressure, reduced pressure, or increased pressure. When the organic component such as resin binder is included in the composition (in the film), heat treatment (degreasing treatment) is preferably carried out prior to the first step and the second step in a temperature range of 100° C. or more and 600° C. or less for a holding time of 5 hours or more. The heat treatment atmosphere is not particularly limited and may be, for example, a vacuum atmosphere, an inert gas atmosphere, or an oxidizing gas atmosphere. In addition, the pressure condition may be any of normal pressure, reduced pressure, or increased pressure.

(Constitution of Aluminum Electrolytic Capacitor)

In order to produce the aluminum electrolytic capacitor using the aluminum electrode 10 after chemical formation (the electrode for the aluminum electrolytic capacitor) of this embodiment, for example, a capacitor element is formed by winding the anode foil made of the porous aluminum electrode 10 after chemical formation (the electrode for the aluminum electrolytic capacitor) and cathode foil with a separator interposed between the anode and the cathode. Subsequently, the capacitor element is impregnated with an electrolytic solution (a paste). Thereafter, the capacitor element including the electrolytic solution is placed in an outer case and the case is sealed with a sealing body.

When a solid electrolyte is used instead of the electrolytic solution, a solid electrolyte layer is formed on the surface of the anode foil made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, an anode terminal to be electrically connected to the anode and a cathode terminal to be electrically connected to the cathode layer are provided. In this case, a plurality of pieces of anode foil may be laminated.

As the aluminum electrode 10, a structure in which the porous layer 30 is laminated on the surface of the rod-like aluminum core material 20 may be employed in some cases. In order to produce the aluminum electrolytic capacitor using such an aluminum electrode 10, for example, a solid electrolyte layer is formed on the surface of the anode made of the aluminum electrode 10 after chemical formation (the electrode for the aluminum electrolytic capacitor) and thereafter a cathode layer is formed on the surface of the solid electrolyte layer. Thereafter, the obtained product is exteriorized with a resin or the like. In this process, the anode terminal to be electrically connected to the anode and the cathode terminal to be electrically connected to the cathode layer are provided.

(Outline of Method for Producing Electrode for Aluminum Electrolytic Capacitor)

Figure 3:
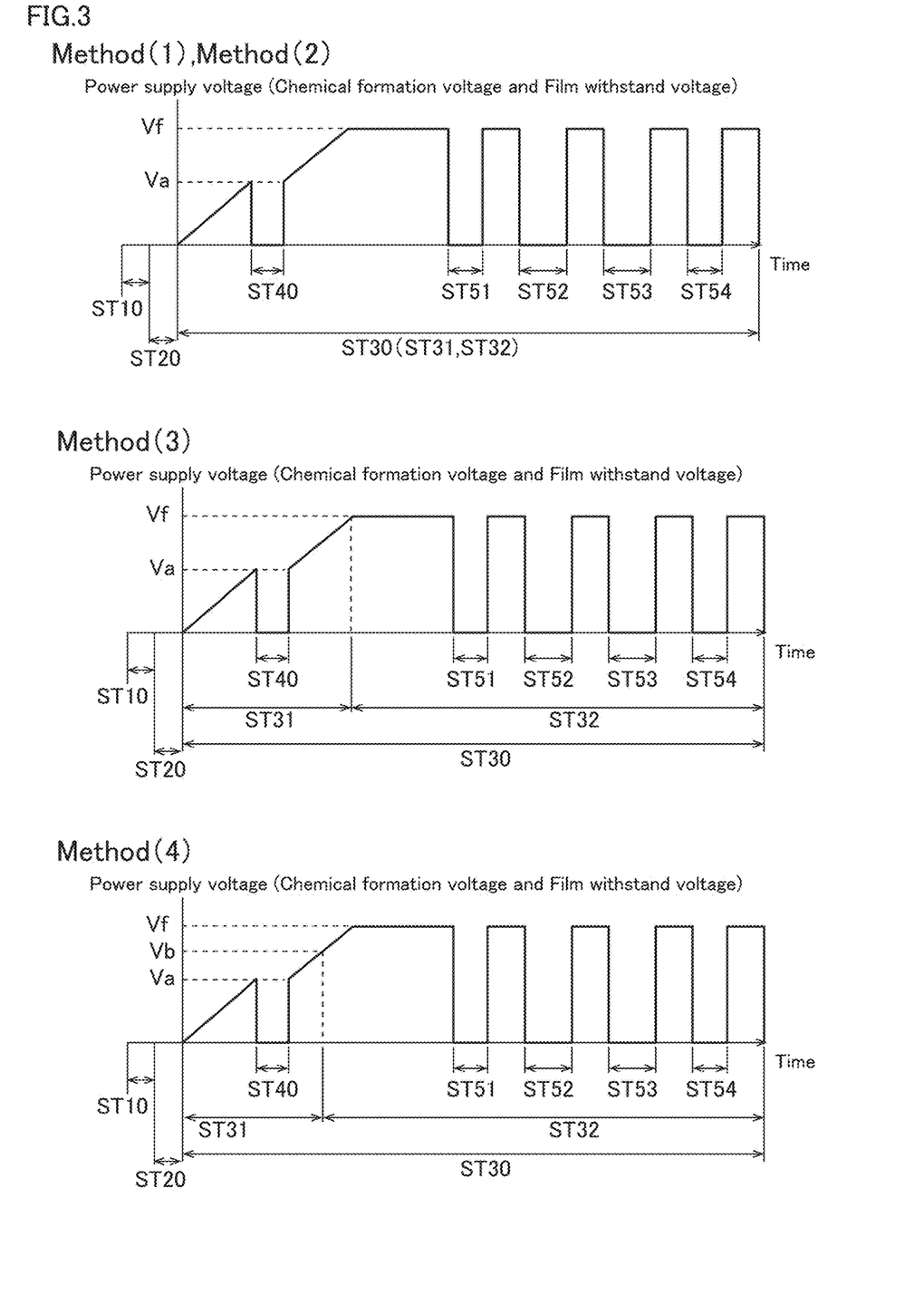
FIG. 3 is an explanatory view illustrating a method of producing the electrode for an aluminum electrolytic capacitor to which the present invention is applied.

FIG. 3 is an explanatory view illustrating methods of producing the electrode for an aluminum electrolytic capacitor to which the present invention is applied. FIGS. 3(a), 3(b), and 3(c) each are explanatory views illustrating respective methods of the chemical formation step.

First, as illustrated in FIG. 3, in the method for producing the electrode for the aluminum electrolytic capacitor, the pure water boiling step ST10 for boiling the aluminum electrode 10 in pure water is carried out and thereafter the chemical formation step ST30 for subjecting the aluminum electrode to the chemical formation 10 until the film withstand voltage reaches 400 V or more, followed by carrying out a drying step.

In the pure water boiling step ST10, the aluminum electrode 10 is boiled in pure water having a liquid temperature of 60° C. to 100° C. for 1 minute to 20 minutes to form a hydrated aluminum film such as boehmite on the aluminum electrode 10.

Figure 4:
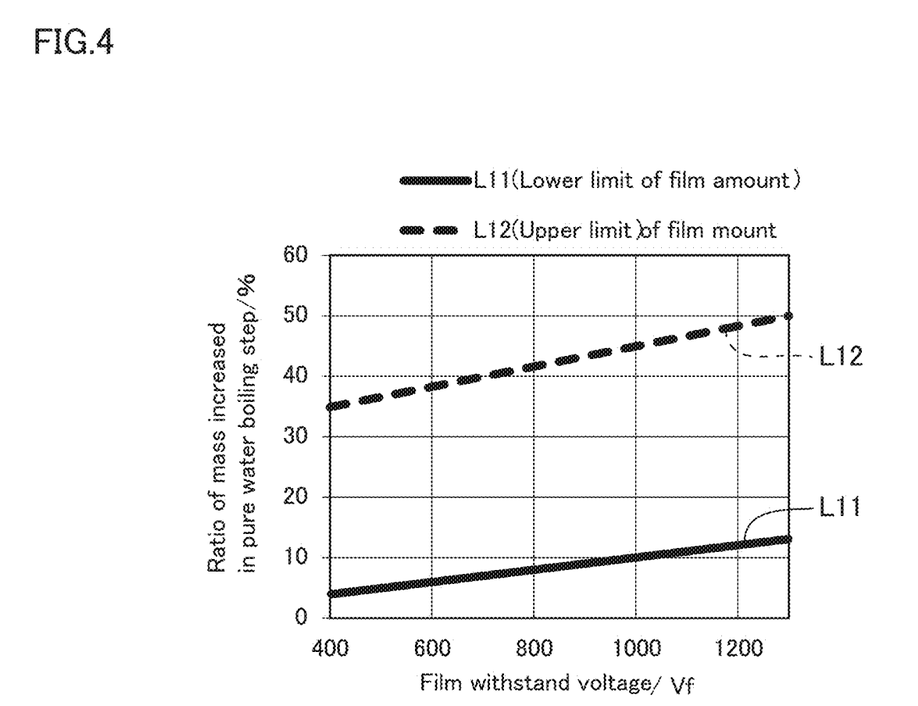
FIG. 4 is a graph illustrating an appropriate range of the hydrated aluminum film amount produced in the pure water boiling step in the method for producing the electrode for an aluminum electrolytic capacitor to which the present invention is applied.

The amount of the hydrated aluminum film produced in the pure water boiling step ST10 is preferably determined to be a range from the lower limit of x indicated by the solid line L11 in FIG. 4 to the upper limit of x indicated by the broken line L12 in FIG. 4, when the ratio x of the mass increased by the pure water boil step is represented by the following formula.

$$x = [(\text{Mass (g) of aluminum electrode 10 increased by pure water boiling}/(\text{Mass (g) of aluminum electrode 10 before pure water boiling})] \times 100 (\% \text{ by mass})$$

More specifically, when the final film withstand voltage of the chemical formation film is represented by Vf (V) and the ratio of the mass increased by the pure water boiling step is represented by x, the solid line L11 indicating the lower limit of x is represented by the following formula.

$$x = (0.01 \times Vf)$$

The broken line L12 indicating the upper limit of x is represented by the following formula.

$$x = (0.017 \times Vf + 28)$$

Therefore, in this embodiment, the conditions of the pure water boiling step ST10 is preferably set so that the film withstand voltage Vf (V) and the ratio x (% by mass) satisfy the following conditional formula.

$$(0.01 \times Vf) \leq x \leq (0.017 \times Vf + 28)$$

When the amount of hydrated aluminum film is appropriate, a sufficiently thick chemical formation film can be formed with a small amount of electricity in the chemical formation step ST30. In contrast, when x is less than the lower limit of the above conditional formula, excessive heat generation occurs in the chemical formation step ST30 and thus a robust chemical formation film is not formed. When x is more than the upper limit of the above conditional formula, the hydrated aluminum film becomes excessive and thus the organic acid aqueous solution used for the organic acid immersion treatment described later and the organic acid aqueous solution used for the chemical formation liquid are easily trapped in in the pores 35 of the porous layer 30.

In this embodiment, as illustrated in FIG. 3, the organic acid immersion step ST20 of immersing the aluminum electrode 10 in an organic acid aqueous solution containing the organic acid represented by any one of Chemical Formulas (1), (2), and (3) is carried out after the pure water boiling step ST10 and before the chemical formation step ST30. In the present embodiment, the concentration of the organic acid in the organic acid aqueous solution is from 0.001 M (mol/L) to 1.0 M and the liquid temperature is from 30° C. to 100° C.

Chemical Formula (1)

Chemical Formula (2)

Chemical Formula (3)

In Chemical Formulas (1), (2), and (3),

R is a saturated hydrocarbon, an unsaturated hydrocarbon, or an aromatic hydrocarbon having 1 or more carbon atoms.

Examples of the organic acid corresponding to Chemical Formula (1) include dodecanoic acid and benzoic acid. Examples of the organic acid corresponding to Chemical Formula (3) include propanedioic acid, butanedioic acid, (E)-2-butenedioic acid (fumaric acid), pentanedioic acid, hexanedioic acid, decanedioic acid, and dodecanedioic acid. Examples of the organic acid corresponding to Chemical Formula (1) include 2-hydroxypropane-1,2,3-tricarboxylic acid and (E)-1-propene-1,2,3-tricarboxylic acid.

According to such an organic acid immersion step ST20, dissolution of the hydrated film in the chemical formation liquid can be reduced and the voids generated in the hydrated film in the pure water boiling step ST10 can be exposed by dissolution of the hydrated film with the organic acid aqueous solution. Therefore, the voids in the chemical formation film can be reduced.

In this embodiment, in the chemical formation step ST30, the phosphoric acid immersion step ST40 for immersing the aluminum electrode 10 into an aqueous solution containing phosphate ions is carried out one or more times in the course of voltage rise of the power supply voltage to the chemical formation voltage. In such a phosphoric acid immersion step ST40, the aluminum electrode 10 is immersed in a phosphoric acid aqueous solution having a liquid temperature of 40° C. to 80° C. and a specific resistance measured at 60° C. of 0.1 Ωm to 5 Ωm for a period of 3 minutes to 30 minutes. The phosphoric acid immersion step ST40 is carried out one or more times. FIG. 3 illustrates the case where the phosphoric acid immersion step ST40 is carried out once when the film withstand voltage reaches the voltage Va lower than the final chemical formation voltage Vf.

According to such a phosphoric acid immersion step ST40, the organic acid remaining inside the porous layer can be removed by the organic acid immersion step ST20. In addition, the precipitated aluminum hydroxide can be efficiently removed in the chemical formation step ST30 and the subsequent generation of aluminum hydroxide can be reduced. Therefore, the residual chemical formation liquid inside the pores of the porous layer can be reduced. In addition, phosphate ions can be taken into the chemical formation film by the phosphoric acid immersion step and thus the stability of the chemical formation film such as being possible to improve durability to immersion in boiling water or acidic solution can be effectively improved.

(Specific Example of Chemical Formation Step ST30)

Among the methods (1), (2), (3) and (4) illustrated in FIG. 3, a first chemical formation treatment ST31 is carried out using an aqueous solution of an organic acid such as adipic acid or a salt thereof is used as the chemical formation liquid in the method (1) illustrated in FIG. 3. For example, the aluminum electrode 10 is subjected to the chemical formation in an aqueous solution (an organic acid-based chemical formation liquid) containing an organic acid such as adipic acid or a salt thereof and having a specific resistance of 5 Ωm to 500 Ωm measured at 50° C. under a condition of a liquid temperature of 30° C. to 80° C. In this process, the power supply voltage applied between the aluminum electrode 10 and the counter electrode is raised until the power supply voltage reaches the final chemical formation voltage Vf and thereafter the power supply voltage is retained at the chemical formation voltage Vf. In this embodiment, the liquid temperature is set 80° C. or lower in such a first chemical formation treatment ST31 and thus elution of aluminum at the time of chemical forming can be reduced. Therefore, a state where the aqueous solution containing the organic acid or the salt thereof is trapped in the pores 35 of the porous layer 30 by precipitating the aluminum ions as aluminum hydroxide is difficult to occur. In addition, the liquid temperature is set 30° C. or more and thus a high electrostatic capacitance can be obtained. In the first chemical formation treatment ST31, when the specific resistance of the chemical formation liquid is more than 500 Ωm, the effect of improving the electrostatic capacitance is difficult to obtain and when the specific resistance of the chemical formation liquid is less than 5 Ωm, the organic acid or the salt thereof trapped in the pores 35 of the porous layer 30 easily burns and explodes.

Here, when the first chemical formation treatment ST31 for performing chemical formation of the aluminum electrode 10 having a thick and complicated shape of the porous layer 30 in an aqueous solution containing the organic acid or the salt thereof is carried out, the break of the pores 35 due to the thickness of the porous layer 30 easily occurs. In particular, when the chemical formation is carried out using the porous layer 30 having a thickness of 250 μm or more at a voltage of 400 V or more, clogging tends to occur due to the precipitation of aluminum hydroxide even when the chemical formation liquid conditions and depolarization conditions are optimized. In this embodiment, however, the phosphoric acid immersion step ST40 is carried out and thus the precipitated aluminum hydroxide can be effectively removed before clogging occurs and the formation of aluminum hydroxide thereafter can be reduced. Therefore, the residual aqueous solution containing the organic acid or the salt thereof in the pores 35 of the porous layer 30 can be reduced. In addition, phosphate ions can be taken into the chemical formation film by the phosphoric acid immersion step ST40. Therefore, the durability to the immersion in boiling water or an acidic solution can be improved and thus the stability of the chemical formation film can be improved.

In the chemical formation step ST30, after the voltage reaches the chemical formation voltage Vf, depolarization treatment such as the thermal depolarization treatment for heating the aluminum electrode 10 and in-liquid depolarization treatment for immersing the aluminum electrode 10 in an aqueous solution containing phosphate ions is carried out. Each of the methods (1), (2), (3), and (4) illustrated in FIG. 3 illustrates the case where four depolarization treatment ST51, ST52, ST53, and ST54 are carried out. The depolarization treatment is carried out by combining the thermal depolarization treatment and the in-liquid depolarization treatment. In any combinations, the final depolarization treatment is preferably the thermal depolarization treatment. In addition, the aluminum electrode 10 is preferably subjected to water washing treatment for 5 minutes or more before the thermal depolarization treatment that is carried out first from among the thermal depolarization treatments.

In the thermal depolarization treatment, for example, the treatment temperature is from 450° C. to 550° C. and the treatment time is from 2 minutes to 10 minutes. In the in-liquid depolarization treatment, the aluminum electrode 10 is preferably immersed in an aqueous solution of 20% by mass to 30% by mass phosphoric acid at a liquid temperature of 60° C. to 70° C. for 5 minutes to 15 minutes depending on the film withstand voltage. In the in-liquid depolarization treatment, no voltage is applied to the aluminum electrode 10.

Among the methods (1), (2), (3) and (4) illustrated in FIG. 3, a second chemical formation treatment ST32 is carried out using an aqueous solution of an inorganic acid such as boric acid and phosphoric acid as the chemical formation liquid in the method (2) illustrated in FIG. 3, instead of the first chemical formation treatment ST31 using the aqueous solution of the organic acid such as adipic acid or the salt thereof is used as the chemical formation liquid. For example, in the aqueous solution (inorganic acid-based chemical formation liquid) containing an inorganic acid such as boric acid or phosphoric acid or a salt thereof and having a specific resistance measured at 90° C. of 10 Ωm to 1000 Ωm, the aluminum electrode 10 is subjected to the chemical formation under conditions of a liquid temperature of 50° C. to 95° C. In the second chemical formation treatment ST32, the elution of aluminum at the time of chemical formation can be reduced by setting the liquid temperature of the chemical formation liquid to 95° C. or less. For this reason, a state that the precipitation of aluminum ions as aluminum hydroxide fills the pores 35 of the porous layer 30 and thus the electrostatic capacitance is lowered can be prevented. By setting the liquid temperature of the chemical formation liquid to 50° C. or more, a high film withstand voltage can be obtained. Here, when the specific resistance of the chemical formation liquid is more than 1000 Ωm, a robust film is not formed and the leakage current becomes extremely high. In contrast, when the specific resistance of the chemical formation liquid is less than 10 Ωm, spark discharge occurs during the chemical formation and thus the formed chemical formation film is broken.

In addition, as in the method (3) illustrated in FIG. 3, the first chemical formation treatment ST31 using the aqueous solution of the organic acid such as adipic acid or the salt thereof as the chemical formation liquid may be carried out until the voltage reaches the chemical formation voltage Vf and after the voltage reaches the chemical formation voltage Vf, the second chemical formation treatment ST32 using the aqueous solution containing the inorganic acid such as boric acid or phosphoric acid or the salt thereof as the chemical formation liquid may be carried out.

In addition, as in the method (4) illustrated in FIG. 3, after the phosphoric acid immersion step ST40, the first chemical formation treatment ST31 using the aqueous solution of the organic acid such as adipic acid or the salt thereof is used as the chemical formation liquid may be carried out until the voltage reaches the voltage Vb before reaching the chemical formation voltage Vf, and thereafter the second chemical formation treatment ST32 using the aqueous solution containing the inorganic acid such as boric acid and phosphoric acid or the salt thereof as the chemical formation liquid may be carried out until the voltage reaches the chemical formation voltage Vf and after the voltage reaches the formation voltage Vf.

Example

Subsequently, Examples of the present invention will be described. First, various kinds of aluminum electrodes 10 listed in Table 1, chemical formation liquids listed in Table 2, and a phosphoric acid aqueous solution (a treatment liquid of the phosphoric acid immersion step ST40) having a liquid temperature of 50° C. and a specific resistance of 0.2 Ωm measured at 50° C. were prepared. Subsequently, after the pure water boiling step ST10 was carried out for the aluminum electrode 10, the organic acid immersion step ST20 was carried out under the conditions listed in Table 3 and thereafter the chemical formation step ST30 was carried out to produce an electrode for an aluminum electrolytic capacitor. In this process, the phosphoric acid immersion step ST40 was carried out under the conditions listed in Table 3.

In the pure water boiling step ST10, the pure water boiling was carried out for 10 minutes in pure water having a liquid temperature of 95° C. In the chemical formation step ST30, in the method (4) illustrated in FIG. 3, the chemical formation was carried out in such a manner that the voltage was raised so that the film withstand voltage reached 600 V in the first chemical formation treatment ST31, and thereafter the second chemical formation treatment ST32 was carried out until the chemical formation voltage reached 800 V. In the course of the first chemical formation treatment ST31, the phosphoric acid immersion step ST40 was carried out under the conditions listed in Table 3.

With respect to the aluminum electrode 10 (the electrode for an aluminum electrolytic capacitor) prepared by such a method, presence/absence of break of the porous layer 30, film withstand voltage, electrostatic capacitance, leakage current, leakage current/electrostatic capacitance were measured. The results are listed in Table 4. The chemical formation voltage was set 800 V and the withstand voltage and the electrostatic capacitance were measured in accordance with JEITA standard.

TABLE 1

| Electrode sample No. | Shape of core material | Average diameter of aluminum powder (μm) | Thickness of porous layer (μm) |
|---|---|---|---|
| 1 | Foil (thickness 30 μm) | 5 | 200/one surface |
| 2 | Rod-like shape (diameter 1 mm) | 5 | 1000 |

TABLE 2

| Composition of chemical formation liquid | Liquid temperature (° C.) |
|---|---|
| Chemical formation liquid for first chemical formation treatment ST31 Aqueous solution of ammonium adipate having specific resistance of 50 Ωm measured at 50° C. | 60 |
| Chemical formation liquid for second chemical formation treatment ST32 Aqueous solution of boric acid aqueous solution having specific resistance of 100 Ωm measured at 90° C. | 90 |

TABLE 3

| Electrode sample No. | Kind of organic acid | Organic acid immersion step ST20 | | | Phosphoric acid immersion step ST40 period (minute)/number of times | Remarks |
|---|---|---|---|---|---|---|
| | | Concentration of organic acid (M) | Temperature (° C.)/period (minute) | | | |
| 1 | Dodecanoic acid | 0.005 | 90/2 | | 10/2 | Example 1 |
| 1 | Hexanedioic acid | 0.08 | 60/15 | | 15/2 | Example 2 |
| 1 | (E)-2-Butenedioic acid | 0.08 | 70/10 | | 10/3 | Example 3 |
| 1 | Decanedioic acid | 0.005 | 90/2 | | 10/2 | Example 4 |
| 1 | 2-Hydroxypropane-1,2,3-tricarboxylic acid | 0.1 | 85/5 | | 10/2 | Example 5 |
| 2 | Hexanedioic acid | 0.03 | 60/15 | | 15/2 | Example 6 |
| 1 | — | — | — | | 0/0 | Comparative Example 1 |
| 1 | (E)-2-Butenedioic acid | 0.04 | 80/5 | | 0/0 | Comparative Example 2 |
| 1 | Ethanedioic acid | 0.03 | 80/5 | | 5/1 | Comparative Example 3 |

TABLE 4

| Remarks | Presence/absence of break of the porous layer 30 | Film withstand voltage (V) | Electrostatic capacitance (μF/cm$^2$) | Leakage current (μA/cm$^2$) | Leakage current/Electrostatic capacitance (μA/μF) |
|---|---|---|---|---|---|
| Example 1 | Absence | 805 | 1.40 | 90 | 62 |
| Example 2 | Absence | 834 | 1.42 | 80 | 56 |
| Example 3 | Absence | 831 | 1.43 | 75 | 52 |
| Example 4 | Absence | 838 | 1.47 | 70 | 48 |
| Example 5 | Absence | 806 | 1.45 | 80 | 55 |
| Example 6 | Absence | 814 | 2.31 | 120 | 85 |
| Comparative Example 1 | Presence | 311 | 0.7 | 2100 | 3000 |
| Comparative Example 2 | Presence | 280 | 0.8 | 3400 | 4250 |
| Comparative Example 3 | Absence | 788 | 1.41 | 230 | 163 |

As can be seen from Table 3 and Table 4, the leakage current is large in Comparative Example 1 in which the organic acid immersion step ST20 and the phosphoric acid immersion step ST40 were not carried out, Comparative Example 2 in which the phosphoric acid immersion step ST40 was not carried out, and the Comparative Example 3 in which ethanedioic acid was used in the organic acid immersion step ST20, whereas the leakage current is small in Examples 1 to 6.

In particular, the organic acid depolarization and the phosphoric acid depolarization in the course of voltage rise were not carried out in Comparative Example 1 and thus the leakage current is large. In Comparative Example 2, although (E)-2-butenedioic acid corresponding to Chemical Formula (2) was used, the organic acid remaining on the surface of the film burned during the thermal depolarization to break the porous layer because the phosphoric acid immersion step ST40 in the course of the voltage rise was not carried out and thus the leakage current is large. In Comparative Example 3, ethanedioic acid having no carbon atoms in R in Chemical Formula (2) was used and thus the effect of reducing the leakage current is small.

Other Examples

In Examples described above, in the chemical formation step ST30, as in the method (4) illustrated in FIG. 3, the first chemical formation treatment ST31 was carried out until the voltage reached the voltage Vb before reaching the chemical formation voltage Vf after the phosphoric acid immersion step ST40 and thereafter the second chemical formation treatment ST32 is carried out. However, as in the method (3) illustrated in FIG. 3, the present invention may be applied to the case where the first chemical formation treatment ST31 is carried out until the voltage reached the chemical formation voltage Vf and thereafter the second chemical formation treatment ST32 is carried out. In addition, as in the method (1) illustrated in FIG. 3, the present invention may be applied when all of the chemical formation step ST30 is carried out as the first chemical formation treatment ST31. In addition, as in the method (2) illustrated in FIG. 3, the present invention may be applied when all of the chemical formation step ST30 is carried out as the second chemical formation treatment ST32.

The invention claimed is:

1. A method for producing an electrode for an aluminum electrolytic capacitor, the method comprising:
   a pure water boiling step of boiling an aluminum electrode in which a porous layer made of a sintered layer of aluminum powder having an average particle diameter of 1 μm to 10 μm is laminated in a thickness of 150 μm to 3000 μm on a surface of an aluminum core material in pure water;
   an organic acid immersion step of immersing the aluminum electrode in an organic acid aqueous solution containing an organic acid represented by any one of Chemical Formulas (1), (2), and (3) after the pure water boiling step, $$R\text{—}COOH \qquad \text{Chemical Formula (1)}$$

$$R\text{—}(COOH)_2 \qquad \text{cal Formula (2)}$$

$$R\text{—}(COOH)_3 \qquad \text{cal Formula (3)}$$

in Chemical Formulas (1), (2), and (3)
      R is a saturated hydrocarbon, an unsaturated hydrocarbon, or an aromatic hydrocarbon having 1 or more carbon atoms; and
   a chemical formation step of performing chemical formation of the aluminum electrode to a chemical formation voltage of 400 V or more after the organic acid immersion step, wherein
   in the chemical formation step, a phosphoric acid immersion step of immersing the aluminum electrode in an aqueous solution containing phosphate ions is carried out one or more times in the course of raising voltage to the chemical formation voltage.

2. The method for producing the electrode for an aluminum electrolytic capacitor according to claim 1, wherein the organic acid is any one of dodecanoic acid, benzoic acid, propanedioic acid, butanedioic acid, (E)-2-butenedioic acid (fumaric acid), pentanedioic acid, hexanedioic acid, decanedioic acid, dodecanedioic acid, 2-hydroxypropane-1,2,3-tricarboxylic acid, and (E)-1-propene-1,2,3-tricarboxylic acid.

3. The method for producing the electrode for an aluminum electrolytic capacitor according to claim 1, wherein
   the chemical formation step comprises an organic acid chemical formation step of carrying out the chemical formation in an aqueous solution containing an organic acid or a salt thereof in the course of raising a film withstand voltage to the chemical formation voltage, and
   the phosphoric acid immersion step is carried out in the course of the organic acid chemical formation step.

* * * * *